United States Patent [19]

Nishiguchi

[11] Patent Number: 4,829,522
[45] Date of Patent: May 9, 1989

[54] APPARATUS FOR DECODING A DIGITAL SIGNAL
[75] Inventor: Masayuki Nishiguchi, Tokyo, Japan
[73] Assignee: Sony Corporation, Tokyo, Japan
[21] Appl. No.: 13,503
[22] Filed: Feb. 9, 1987
[30] Foreign Application Priority Data Feb. 8, 1986 [JP] Japan .................................. 61-26578

[51] Int. Cl.⁴ ...................... G08C 25/00; G06F 11/00
[52] U.S. Cl. ...................................... 371/31; 360/38.1
[58] Field of Search ......................... 371/31; 360/38.1; 358/314, 327, 336

[56] References Cited

U.S. PATENT DOCUMENTS

| | | | |
|---|---|---|---|
| 4,224,689 | 9/1980 | Sundberg | 371/31 X |
| 4,291,405 | 9/1981 | Jayant et al. | 371/31 |
| 4,375,581 | 3/1983 | Jayant | 371/31 X |
| 4,497,055 | 1/1985 | Hoshino et al. | 371/31 |
| 4,519,001 | 5/1985 | Morrison | 371/31 X |
| 4,641,309 | 2/1987 | Nakano et al. | 371/31 |
| 4,688,224 | 8/1987 | Dal Degan et al. | 371/31 |
| 4,716,565 | 12/1987 | Suma | 371/31 |

Primary Examiner—Charles E. Atkinson
Attorney, Agent, or Firm—Hill, Van Santen, Steadman & Simpson

[57] ABSTRACT

A decoding device for decoding digital signals that are transmitted after being processed separately blockwise, performs error interpolation by using only the data within a block where the code error has occurred, in such a manner that the adverse effect of using the data of other blocks for an error interpolation in the vicinity of the block boundary may be avoided, and the error interpolation may be attained by a shorter operating word length in advance of blockwise decoding.

10 Claims, 4 Drawing Sheets

APPARATUS FOR DECODING A DIGITAL SIGNAL

BACKGROUND OF THE INVENTION

1. Field of the Invention

This invention relates to a decoding device for signals transmitted in blocks and, more particularly, to such device for decoding digital signals such as PCM signals, that are transmitted in consecutive blocks each consisting of a predetermined number of words.

2. Description of the Prior Art

In recent years, it has become customary to make a sampling of analog audio or video signals, followed by quantization and encoding, and to transmit or otherwise record and/or reproduce the resulting signals in what is called pulse code modulcation (PCM) signals.

In transmitting or recording and/or reproducing these PCM signals, the practice commonly adopted for obtaining a bandwidth of, for example, 20 kHz and an S/N ratio of higher than about 90 dB, is to use a sampling frequency $f_s$ of 44.1 kHz and the linear quantization of 16 bits per word. However, the transmission rate in this instance reaches an extremely high value of 700 kbits per second (KBPS) or even higher.

In case of the digital signals obtained by A/D conversion of analog signals, such as the aforementioned audio and video signals, it is possible to compress the volume of the information, since these signals are naturally subject to deviation in their statistical properties and certain signal portions are less critical in view of their visual and aural effects. For example, it has been known that differential or summation processing or companding results in only limited deterioration in the quality of the transmitted or recorded signals.

With this in view, it has been proposed by the present Applicant in the copending Japanese Laid-open Patent Pulbications No. 223032/1984, 223033/1984, 223034/1984, 54537/1985, 103746/1985 and 58732/1985, and Japanese Applications Nos. 278501/1984 and 278504-278506/1984, that the digital PCM signals, for example, are formed in blocks after each predetermined number of words, and the signals are subjected block unit or blockwise to a predicting processing such as difference processing or companding before transmission or recording and/or reproduction.

In these techniques, the prediction filter processing mode, or the bit compression ratio or range, is switched blockwise before transmission or recording on the recording medium. At the receiving or reproducing side, the decoding processing is carried out blockwise in accordance with the mode or range at the transmitting or recording side for restoring the original input signals.

An example of the audio bit reduction system employing these techniques is now explained by referring to FIG. 1.

The system of FIG. 1 is made up of a transmitting or recording side encoder 10 and a receiving or reproducing side decoder 30. To an input terminal 11 of the encoder 10 are supplied PCM signals x(n) obtained by sampling analog audio signals by a frequency fs, followed by quantizing and encoding. These input signals x(n) are supplied to a prediction unit 12 and an adder 13. The predicted signal $\bar{x}(n)$ from the prediction unit 12 is supplied as the subtractive signal to the adder 13. Thus, in the adder 13, the predicted signal $\bar{x}(n)$ is subtracted from the input signals x(n) to produce as the output a predicted error signal or, in the broad sense of the term, a difference output d(n), as shown by an equation $$d(n) = x(n) - \bar{x}(n) \quad (1)$$

It will be noted that the prediction unit 12 computes predicted values $x(\bar{n})$ a linear combination of the past p number of inputs x(n−p), x(n−p+1), ..., x(n−1), such that $$\bar{x}(n) = \sum_{k=1}^{P} a_k \cdot x(n-k) \quad (2)$$

wherein $a_k$ (k=1, 2, ..., P) stands for a coefficient. Hense, the predicted error output or, in the broad sense of the term, the difference d(n), is given by $$d(n) = x(n) - \sum_{k=1}^{P} a_k \cdot x(n-k) \quad (3)$$

In the present example, the data of the input digital signals are formed into blocks at prescribed time periods, that is after each prescribed number of workds of the input data, and a set of the coefficienets $a_k$ is selected in order to obtain optimum prediction filter characteristics for each block. Therefore, it may be attempted to provide a plurality of filters for obtaining a difference output or predicted error output inclusive of the adders and the prediction units of different properties and select the optimum one of these difference processing filters for each of the aforementioned blocks. The selection of the optimum filter is made in a prediction and range adaptive circuit 21 by comparing the maximum absolute values or peak values in each of the blocks of the outputs from the plural difference processing filters, or the maximum absolute values or peak values multiplied by a coefficient, with one another. More specifically, the difference processing filter that minimizes the maximum absolute value multiplied or not multiplied by the coefficient is selected as the optimum filter for the block. The optimum filter selection information at this time is outputted as the mode selection information from the prediction and range adaptive circuit 21 to the prediction unit 12.

The difference output d(n) as the predicted error is supplied through an adder 14 to bit compression means consisting of a shifter 15 with a gain G and a quantizer 16 so as to be subjected to a compressing or ranging processing wherein, for example, the exponent and mantissa parts in the floating point system correspond to the gain G and to the output from the quantizer 16, respectively. That is, the shifter 15 makes what is called range changing by arithmetically shifting the digital binary data by a bit number depending on the gain G, while the quantizer 16 makes a re-quantization consisting in taking out a prescribed number of bits of the bit-shifted data. Then, a noise shaping circuit 17 or noise shaper makes what is called an error feedback consisting of obtaining a difference between the output and the input of the quantizer 16, or what is called the quantization error, by the adder 18, sending this quantization error to the prediction unit 20 through a shifter 19 with a gain $G^{-1}$ and feeding the predicted signal of the quantization error back to the adder 14 as the subtractive signal.

It will be noted that the prediction and range adaptive circuit 21 outputs a range information on the basis of the maximum absolute value in the block of the difference output from the filter of the selected mode and forwards this range information to the shifters 15 and 19 for determining the gain G and $G^{-1}$ for each block. The characteristics of the prediction unit 20 are also determined by the aforementioned mode information supplied thereto from the prediction and range adaptive circuit 21.

Hence, the output d'(n) from the adder 14 is equal to the difference output d(n) less the predicted signal $\tilde{e}(n)$ of the quantization error from the noise shaper 17, so that $$d'(n)=d(n)-\tilde{e}(n) \qquad (4)$$

such that the output d"(n) from the shifter of the gain G is expressed as $$d''(n)=G\cdot d'(n) \qquad (5)$$

The output $\hat{d}(n)$ from the quantizer 16 is expressed as $$\hat{d}(n)=d''(n)+\tilde{e}(n) \qquad (6)$$

wherein e(n) stands for the quantization error produced in the quantization process. The quantization error e(n) is taken out at an adder 18 of the noise shaper 17. The output signal is then passed through a shifter 19 having a gain $G^{31\ 1}$ and a prediction unit 20 adapted for taking a linear combination of the past r number of input signals. The predicted signal $\tilde{e}(n)$ thus obtained through the prediction unit 20 is expressed as $$\tilde{e}(n) = \sum_{k=1}^{r} \beta_k \cdot \tilde{e}(n-k) \cdot G^{-1} \qquad (7)$$

It will be seen that this equation (7) has the same form as the above equation (2). The prediction units 12 and 20 are finite inpulse rsponse (FIR) filters having system functions of $$P(z) = \sum_{k=1}^{P} a_k z^{-k} \qquad (8)$$

and $$R(z) = \sum_{k=1}^{r} \beta_k z^{-k}$$

respectively.

From these equations (4) to (7), the output $\hat{d}(n)$ from the quantizer 16 is expressed as $$\begin{aligned}\hat{d}(n) &= G \cdot (d(n) - \tilde{e}(n)) + e(n) \\ &= G \cdot d(n) + e(n) - \sum_{k=1}^{r} \beta_k \cdot e(n-k)\end{aligned} \qquad (9)$$

Substituting d(n) of the equation (9) by the equation (3), $$d(n) = G\left(x(n) - \sum_{k=1}^{P} a_k \cdot x(n-k)\right) + e(n) - \sum_{k=1}^{r} \beta_k \cdot e(n-k) \qquad (10)$$

this output $\hat{d}(n)$ being taken out as an output terminal 22. With the z-transform of x(n), e(n) and $\hat{d}(n)$ being X(z), E(z) and $\hat{D}(z)$, respectively, we obtain $$\begin{aligned}\hat{D}(z) &= G \cdot X(z)\left(1 - \sum_{k=1}^{P} a_k \cdot z^{-k}\right) + \\ &\quad E(z)\left(1 - \sum_{k=1}^{r} \beta_k \cdot z^{-k}\right) \\ &= G \cdot X(z)(1 - P(z)) + E(z)(1 - R(z))\end{aligned} \qquad (11)$$

It will be noted that the range information from the prediction and range adaptive circuit 21 is taken at an output terminal 23, while the mode selection information is taken at an output terminal 24.

To an input terminal 31 of a receiving or reproducing side decoder 30 is supplied the signal $\hat{d}'(n)$ obtained from the output $\hat{d}(n)$ from the output terminal 22 of the encoder 10 after transmission or recording and reproduction. This input signal $\hat{d}'(n)$ is supplied to an adder 33 through a shifter 32 having a gain $G^{-1}$. The output $\hat{x}'(n)$ from the adder 33 is passed through a prediction unit 34 and thereby turned into a predicted signal $\overline{x}'(n)$. This predicted signal $\overline{x}'(n)$ is supplied to the adder 33 so as to be summed to the output $\hat{d}''(n)$ of the shifter 32. This summed output is taken out at an output terminal 35 as a decoder output $\hat{x}'(n)$.

It will be noted that the above range information and the mode selection information that are outputted at output terminals 23, 24 of the encoder 10 are introduced at input terminals 36, 37 of the decoder 30, respectivelyl. The range information from the input terminal 36 is sent to the shifter 32 to determine the gain $G-1$, while the mode selection information from the input terminal 37 is sent to the prediction unit 34 to determine the prediction characteristics. These prediction characteristics of the prediction unit 34 are selected so as to be equal to those of the prediction unit 12.

In the above described decoder 30, the output $\hat{d}''(n)$ from the shifter 32 is expressed as $$\hat{d}''(n)=\hat{d}'(n)\cdot G^{-1} \qquad (12)$$

while the output x'(n) from the adder 33 is expressed as $$\hat{x}'(n)=\hat{d}''(n)+\overline{x}'(n) \qquad (13)$$

Since the prediction unit 34 is selected to have the characteristics equal to those of the prediction unit 12, $$\overline{x}'(n) = \sum_{k=1}^{P} a_k \cdot \hat{x}'(n-k)$$

so that, from the equations (12) and (13), $$\hat{x}'(n) - G^{-1} \cdot \hat{d}'(n) + \sum_{k=1}^{P} a_k \cdot \hat{x}'(n-k) \qquad (14)$$

Thus, with z-transform of $\hat{x}'(n)$ and $\hat{d}'(n)$ being $\hat{X}'(z)$ and $\hat{D}'(z)$, $$\begin{aligned}\hat{X}'(z) &= G^{-1} \cdot \hat{D}'(z) + \sum_{k=1}^{P} a_k \cdot \hat{X}'(z) \cdot z^{-k} \\ &= G^{-1} \cdot \hat{D}'(z) + P(z) \cdot X'(z)\end{aligned} \qquad (15)$$

so that $$\hat{X}'(z) = \frac{G^{-1} \cdot \hat{D}'(z)}{1 - P(z)} \quad (16)$$

When it is assumed that no error is caused in the transmission channel or the recording medium and hence $\hat{D}'(z) = \hat{D}(z)$, we obtain, from the equations (11) and (12), $$\hat{X}'(z) = \hat{X}(z) + G^{-1} \cdot E(z) \frac{1 - R(z)}{1 - P(z)} \quad (17)$$

It is seen from this equation (17) that the noise reducing effect of $G^{-1}$ is obtained relative to the quantization error $E(z)$. With the spectrum distribution of the noise at the decoder output being $N(z)$, we obtain $$N(z) = E(z) \frac{1 - R(z)}{1 - P(z)} \quad (18)$$

When the code error is produced in such a bit reduction system, error correction or error interpolation is performed at the side of the decoder 30. It will be noted that, after the data decoding such as the expansion or semi-momentary processing or predictive decoding processing by units of blocks, the word length is restored to that of the original input data, that is the pre-encoded input data, so that the operating word length for error interpolation becomes correspondingly larger. It is therefore desirable that the error interpolation be executed in advance of the aforementioned decoding processing by units of blocks.

As such error interpolation, it is known to use a mean value interpolation using a mean value of the data before and after the error data, a preceding-value interpolation or a succeeding-value interpolation using a data before or after the error data, respectively. It is customary to use the mean value interpolation.

However, when a mean value interpolation, for example, is applied to the signals having different encode processing modes from block to block, as stated above, inconveniences are caused since the data of the adjacent blocks with the different processing modes are used for interpolating the boundary portions of the blocks, that is, the leading data and the last data of the blocks.

That is, it is assumed that, as shown for example in FIG. 2, the first order differential PCM mode and the straight PCM mode are selected for the first block BL1 and the second block BL2 of the encoder input signals, respectively. The signals output from the encoder and supplied to the decoder through the transmission channel are shown in FIG. 2B wherein data in the first block BL1 are the first order differential PCM data and the data in the second block BL2 are the straight PCM data, so that discontinuities are caused at the boundary between the blocks. Hence, the mean value interpolation should not be adopted for the leading words or the last words of the blocks. This is apparent from the fact that, when a code error should be produced for example at the foremost word Wa of the second block BL2 which is the straight PCM data, it would be meaningless to take a mean value of the data of the different categories, such as first order differential PCM data such as the last word Wb of the first block BL1 and the straight PCM data such as the second word Wc of the second block BL2, and the resulting mean value is approximately wholly unrelated with the error data word Wa.

SUMMARY OF THE INVENTION

In view of the foregoing, it is an object of the present invention to provide a decoding device for decoding signals transmitted in blocks, wherein an effective interpolation can be made even when a code error should occur at the boundary between the adjacent blocks.

The decoding device of the present invention is adapted for decoding input digital signals that are arranged into blocks after each predetermined number of words, and are separately processed blockwise before transmission, characterized in that the interpolation is carried out differently for the blocks of the transmitted signals and in dependence upon the data word position in the block such that the error data can be interpolated by using only the data in the block when the error is produced.

By way of a specific example of the interpolation depending on the word position in the block, the code error at the leading word in a block is interpolated by the data one word after or by the succeeding word data by what is called a succeeding value holding, a code error caused in the last word in the block is interpolated by the data one word before or by the preceding word data by what is called a previous value holding or zero'th order interpolation, and a code error caused in word positions in the block other than those stated above is interpolated by a mean value of the preceding and succeeding word data by what is called a mean value interpolation or first order interpolation.

According to a preferred embodiment of the present invention, a code error caused in the block boundary such as at the leading or last word positions in the two adjacent blocks may be interpolated by using only the data in the block. In this manner, it is possible to perform a interpolation of the signals transmitted with blockwise switching of the range (bit compression ratio) or the modes (such as differential PCM or straight PCM modes) before the bit expansion or predictive decoding, that is, while the word length is as yet short, so that the interpolation remains unaffected by the data of the different nature. In addition, since the error interpolation can be made before the bit expansion or predictive decoding processing when the word length of the data is as yet short, the operating word length for the interpolation may be made shorter, thus resulting in a simpler circuit design and a faster operation.

In addition, when the transmitted signals are interleaved so the temporally consecutive words are located after each predetermined number of words, the delay time for interpolation can be selected in accordance with these plural words, so that interpolation can be made by a simpler circuit design and using only the data in block.

BRIEF DESCRIPTION OF THE DRAWINGS

FIGS. 2A and 2B are waveform diagrams showing the waveforms of the encoder input signals and the same signals during transmission in the block form.

DESCRIPTION OF THE PREFERRED EMBODIMENT

Figure 3:
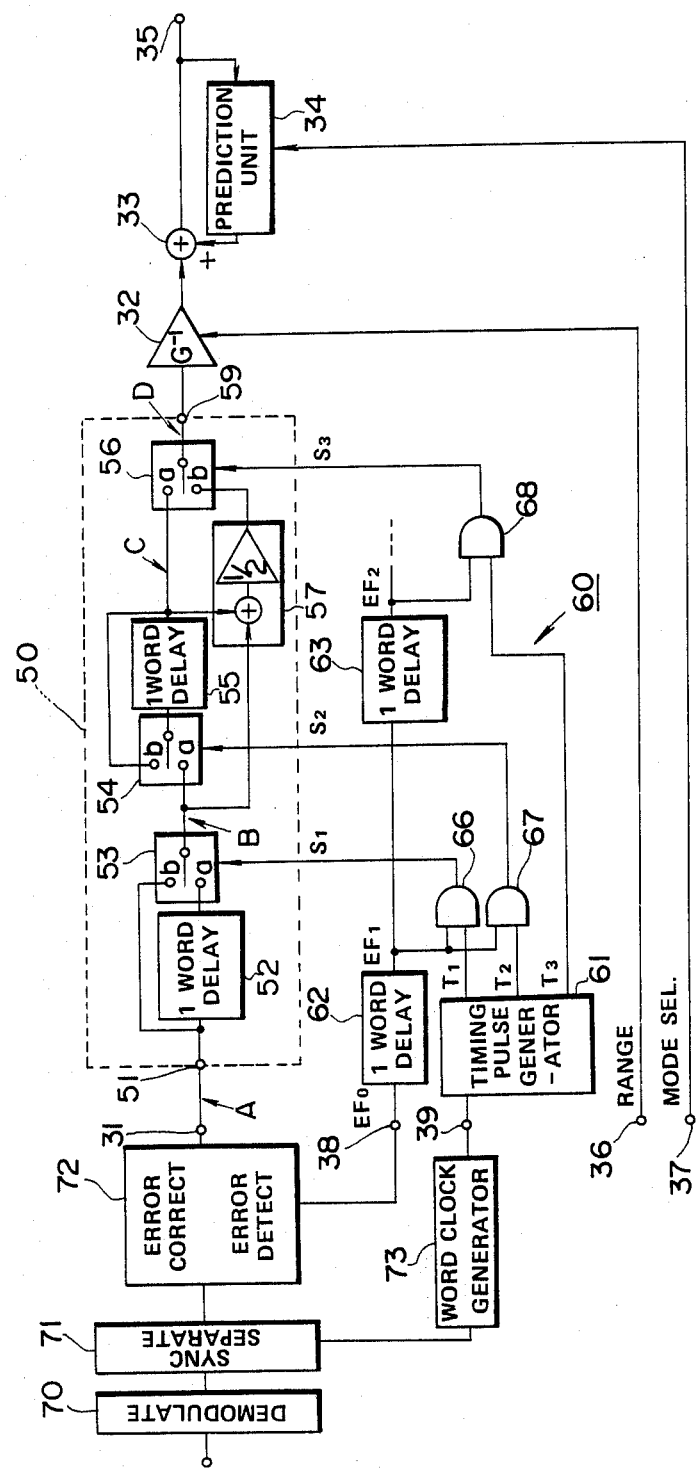
FIG. 3 is a block circuit diagram showing an embodiment of the present invention.

Reference is now has to FIG. 3 illustrating an embodiment of the present invention as applied to the aforementioned audio bit rate reduction system.

Figure 1:
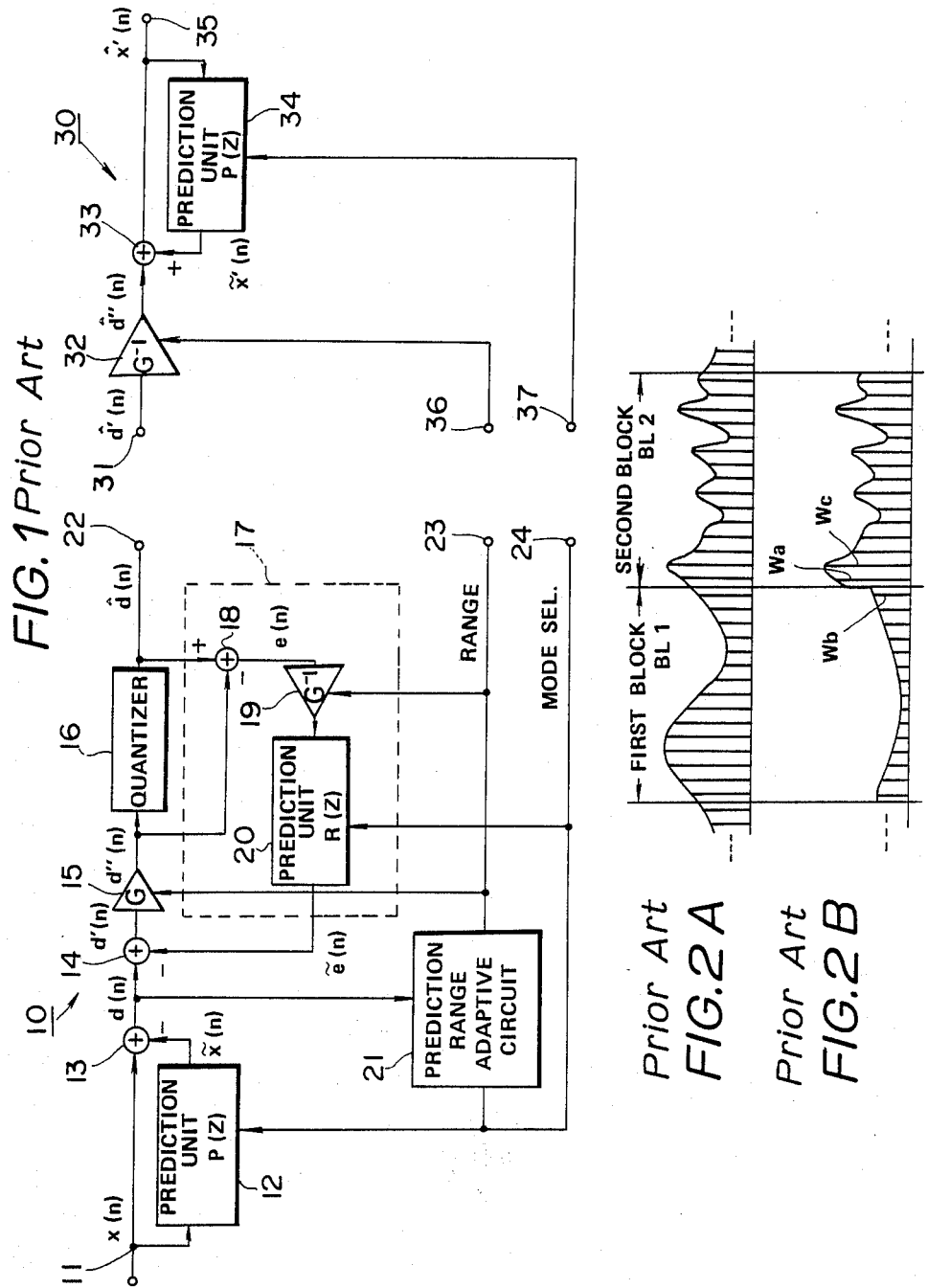
FIG. 1 is a block circuit diagram showing a prior-art example of the audio bit rate reduction system.

In the decoder shown in FIG. 3, the parts or portions similar to those shown in FIG. 1 are indicated by the same reference numerals. Referring to this figure, to an input terminal 31, there are supplied signals from the output terminal 22 shown in FIG. 1, these signals being transmitted and supplied through a transmission medium or a recording medium after having been processed in such a manner that the mode and the range are switchingly selected blockwise as described above.

When transmitting these signals on the transmission medium or the recording medium, it is customary that these signals are converted by a multiplexer into serial data strings, word or block sync data are affixed to these serial data strings and the resulting signals are modulated by a modulating system proper to transmission. At a receiving or reproducing side, there are provided a demodulating circuit 70, a sync separating circuit 71 and a error correcting and detecting circuit 72 so that signals corresponding to the audio signal component are supplied to a terminal 31 and the range information signals are supplied to a terminal 36 while the mode selection information signals are supplied to a terminal 37.

In addition, an error flag from the error detecting circuit 72 is supplied to a terminal 38, while a word clock from a word clock generator 73 is applied to the terminal 39.

The input signal from the terminal 31 corresponding to the transmitted audio signal components in the block form are supplied through an input terminal 51 of an interpolating circuit 50 to a one-word delay circuit 52 and to a terminal b of a changeover switch 53. The output of a one-word delay circuit 52 is supplied to a terminal a of the changeover switch 53. The one-word delay circuit 52 and the changeover switch 53 take charge of the succeeding-value interpolation or holding, as later described in detail. The output from the changeover switch 53 is supplied to a terminal a of a changeover switch 54, the output of which is supplied through the one-word delay circuit 55 to the terminal b of the changeover switch 54. The changeover switch 54 and the one-word delay circuit 55 take charge of the previous value interpolation or holding or zero'th order interpolation, as also described later in detail. The output from the one-word delay circuit 55 is supplied to a terminal a of a changeover switch 56 and to a mean value circuit 57. The circuit 57 computes a value equal to ½ of the sum of the output data from the delay circuit 55 and the output data of the changeover switch 53, or the mean value, which is then supplied to a terminal b of the changeover switch 56. These changeover switches 54, 56, the delay circuit 55 and the mean value circuit 57 take charge of the mean value interpolation or first order interpolation of the error. The output from the changeover switch 56 is taken out at an output terminal 59 of the interpolating circuit 50 so as to be supplied to the shifter 32 of the decoder shown in FIG. 1. The structure and operation of the circuit downstream of the shifter 32 are similar to those of the decoder 30 shown in FIG. 1 so that the corresponding description is omitted for simplicity.

The changeover switches 53, 54 and 56 are switched by switching control signals $S_1$, $S_2$ and $S_3$ from an interpolating control circuit 60. As an example of the switching control operation, when there is no code error, the switches 53, 54 and 56 are all connected to the terminals a. When a code error is caused at the leading or first word of a block, the switch 53 is switched to the terinal b by the signal $S_1$ so that the error is interpolated by the next following value or by the second word in the block. When a code error is caused in the last word of a block, the switch 54 is switched to the terminal b by the signal $S_2$ so that the error is interpolated by the preceding value (previous value holding). When the code error is caused in some other positions, the switches 54, 56 are switched to the terminal b to make a mean value interpolation. For producing these switching control signals $S_1$, $S_2$ and $S_3$, timing pulses $T_1$, $T_2$ and $T_3$ are first produced in a timing pulse generator 61 for designating interpolation modes to be selected in dependence upon the word position in a block, and are used to gate control the error flag $EF_O$ supplied to the terminal 38 by using AND gates 66, 67 and 68. In view of the word delay caused in the delay circuits 52 and 55 in the interpolation circuit 50, it is necessary to set the timing of the pulses $T_1$, $T_2$ and $T_3$ or to delay the error flag EF. To this end, the error flag from the terminal 38 is sequentially delayed one word by two one-word delay circuits 62 and 63.

Figure 4:
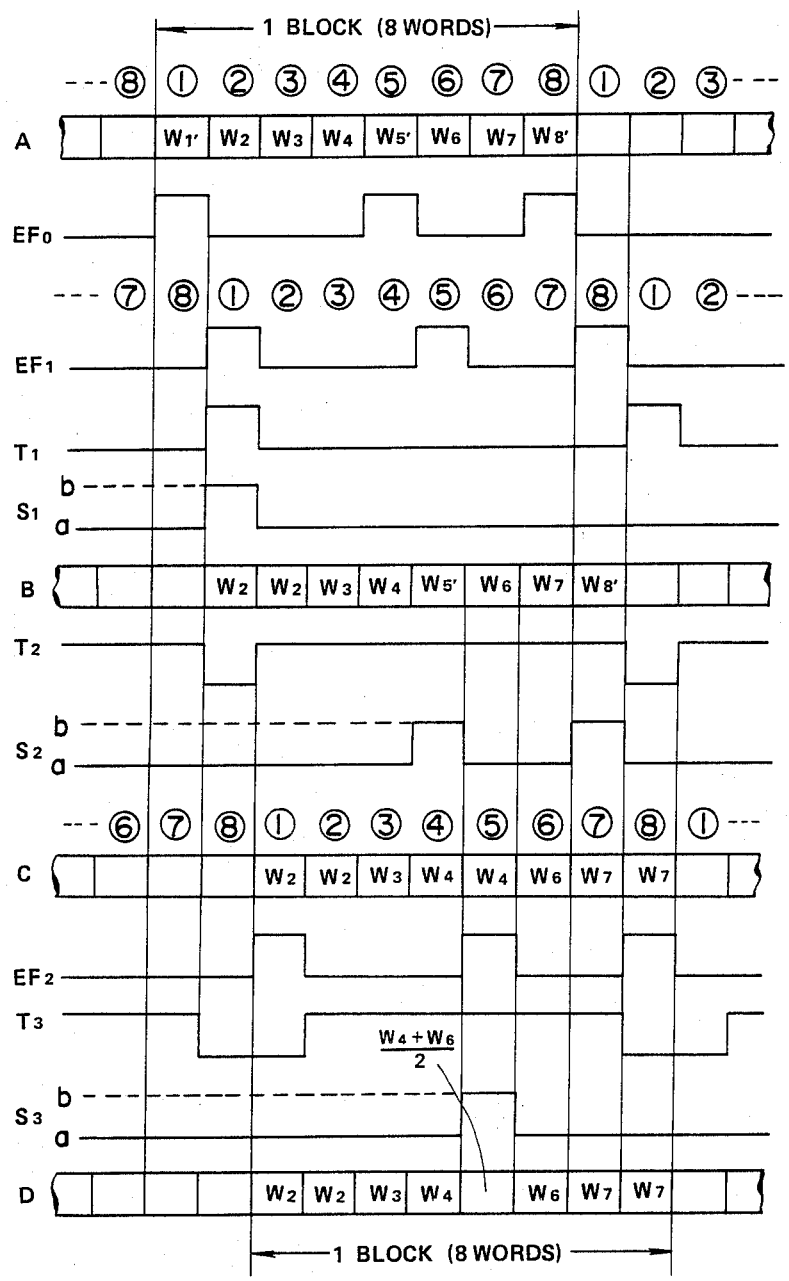
FIG. 4 is a timing chart for illustrating the interpolating operation.

Reference is made to FIG. 4 for illustrating a more specific example of interpolating operation. In the present example, it is assumed that, for simplicity of illustration, the word number in one block is 8, the words are indicated as $W_1, W_2, \ldots, W_8$ from the first word in the block, and code errors are caused in the first, last and some other interjacent word, such as the fifth word.

That is, the input data A shown in FIG. 4 is supplied to the input terminal 51 shown in FIG. 3 and the words $W_1'$, $W_5'$ and $W_8'$ of the eight words in one block are invalid data containing code errors. Hence, the error flag $EF_O$ supplied to the terminal 38 is "1" at the position of these words $W_1'$, $W_5'$ and $W_8'$. It is noted that the circled numerals 1 to 8 in FIG. 4 stand for the corresponding word numbers in the block at the signal input and output points and thus in disregard of the word number deviation caused by word delaying.

Since the input data A is delayed one word in the delay circuit 52, the error flay $EF_O$ is also delayed one word by a delay circuit 62 to produce an error flag $EF_1$ shown in FIG. 4. The timing pulse $T_1$ from the timing pulse generator 61 represents a signal that goes to "1" at the first word position of the signal thus delayed one word and that designates the word position for which the succeeding-value interpolation mode should be selected if the code error exists. An AND is taken of this error flag $EF_1$ and the timing pulse $T_1$ at the AND circuit 66 to produce the switching control signal $S_1$ of the switch 53. This control signal $S_1$ goes to a "1" at, for example, the second word position of the orignial undelayed input data A, that is, at the first word position after the one-word delay of the input data. When the control signal $S_1$ is "1", the switch 53 is switched to the terminal b. Hence, in the output B from the switch 53, the first word in the block or the error word $W_1'$ is substituted by the second word $W_2$ so that the output is the suceeding-value interpolated output.

The timing pulse $T_2$ specifies the range of selection of the preceding-value hold and the mean value interpolation mode, and has a waveform which is an inversion of the timing pulse $T_1$, and thus goes to "1" at other than the first word in the block of the signal delayed by one word. The switching control signal $S_2$ of the switch 54 is obtained by taking an AND of this timing pulse $T_2$ and the error flag $EF_1$ at the AND circuit 67 and goes to "1" at the fifth and last or eighth words. When the switching control signal $S_2$ is "1", the switch 54 is switched to the terminal b so that the output from the delay circuit 55 is fed back to the delay circuit 55. Thus, the output C from the delay circuit 55 has its word numbers further delayed by one word and thus delayed by two words from the original input data A, while the output C produced when the control signal $S_2$ goes to "1" (words $W_4$ and $W_7$) is produced with one word delay for substituting the fifth and the eighth (or last) words in the two-word-delay signal.

In association with the delay caused by this delay circuit 55, the error flag $EF_1$ is delayed one word in a delay circuit 63 to produce an error flag $EF_2$ delayed by two words from the original input error flag $EF_O$. The timing pulse $T_3$ specifies the range of selection of the mean value interpolate mode for the two-word-delay signal. Thus, it goes to "1" at the second to seventh word positions excluding the first and last or eighth word positions. The switching control signal $S_3$ for the switch 56 is obtained by taking an AND of the error flag $EF_2$ and the timing pulse $T_3$ at the AND circuit 68. The control signal $S_3$ goes to "1" only at the fith word position of the two-word-delay signal. At this time, the switch 56 is switched to the terminal b such that a mean value of the word $W_6$ of the output B from the switch 53 and the word $W_4$ of the output C from the delay circuit 55 or $(W_4+W_6)/2$ is taken from the mean value circuit 57 and supplied to an output terminal 59. Hence, the interpolated output from the switch 56 is delayed by two words with respect to the orignial input data A such that the word order in the block is $W_2$, $W_2$, $W_3$, $W_4$, $(W_4+W_6)/2$, $W_6$, $W_7$, $W_7$. In other words, the first word $W_1'$ in the block where the code error has occurred is interpolated by the second word $W_2$ (succeeding value interpolate or hold), the last word $W_8'$ is interpolated by the word $W_7$ one word before (previous value holding) and the interjacent fifth word $W_5'$ is interpolated by the mean value of the preceding and the next following or succeeding words $(W_4+W_6)/2$ (mean value interpolation) such that the interpolation is realized only using the data in the block containing the word where the code error has occurred and thus without using data of any other blocks. This results in satisfactory interpolation since it becomes possible to prevent interpolation of error data by data of different or heterogeneous nature, such as predictive coding processing modes comprising differential or straight PCM modes or range data, that is, the bit compression rate data. In addition, it is only possible to make the interpolation for the data of a shorter word length before the decoding operation such as bit expansion by for example the shifter 32 so that the operation word length is reduced, thus resulting in correspondingly simplified circuit design and increased processing speed.

Figure 5:
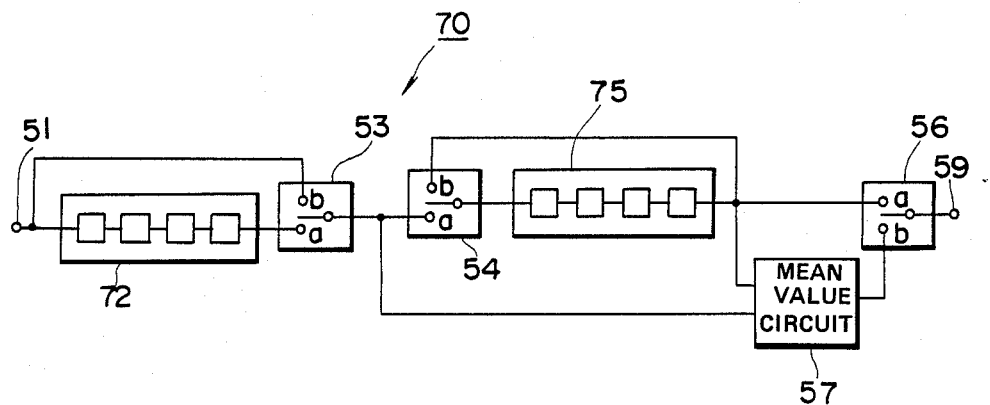
FIG. 5 is a block circuit diagram showing an essential part of a modified embodiment of the present invention.
Figure 6:
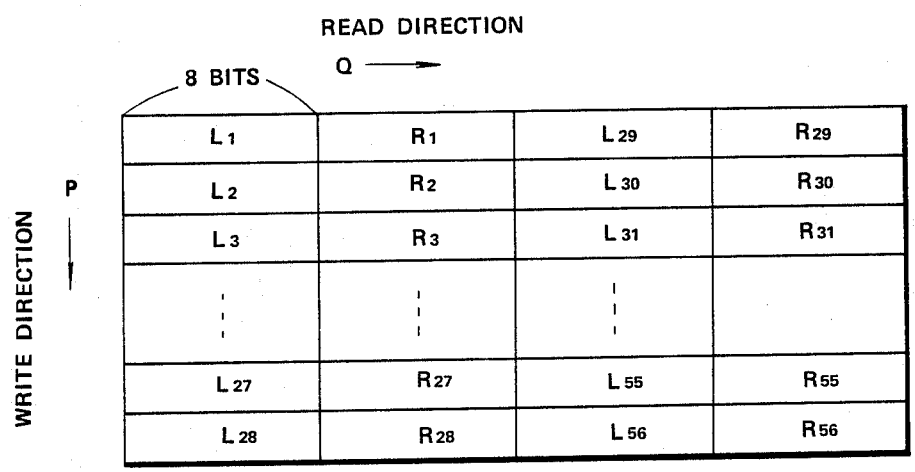
FIG. 6 shows an example of the interleaving processing for the recording format.

Reference is now made to FIGS. 5 and 6 for explaining a modified embodiment of the present invention.

In will be noted that, in case of application of the present invention to, for example, a CD-ROM using an optical disk as the recording medium, it becomes necessary to perform an interleaving in conformity to the recording format. For example, in case of a decoding device in which the data of a four channel audio signal data are repeatedly applied word by word at the four-word periods, the interpolating circuit for the four channels may be provided in a parallel circuit configuration. However, it is also possible to make the interpolation within the block by a simpler arrangement using two four-word delay circuits 72 and 75, as shown in FIG. 5.

In the interpolating circuit 70 shown in FIG. 5, the parts similar to those shown in FIG. 3 are designated by the same reference numerals. The circuit structure is similar to that of FIG. 3 except that the delay circuit 72 and 75 perform the four-word delaying. Thus, the delay circuit 72 and the changeover switch 53 take charge of the succeeding value interpolation or holding in case the code error has occurred at the first word in the block of each channel. Similarly, the changeover switch 54 and the delay circuit 75 take charge of the preceding-value interpolation or holding in case the code error has occurred at the last word in the block in each channel, while the changeover switches 54, 56, the delay circuit 75 and the mean value circuit 57 take charge of the mean value interpolation in case the code error has occurred at the words other than the leading word and the last word in the block.

An example of the four-channel audio signals recorded on the aforementioned CD-ROM is shown in FIG. 6. The left and right channel sterophonic audio signals are separately sampled to produce two-channel data having a word length of for example 16 bits. These data are separately subjected to the aforementioned bit compression processing to produce the left-channel data strings $L_1$, $L_2$, $_3$ . . . and the right-channel data strings $R_1$, $R_2$, $R_3$, . . . , each having the word length of, for example, eight bits. When the two-channel data string with each word consisting of eight bits is recorded on the recording medium such as an optical disk, the data are subjected to interleaving using, for example, a random access memory (RAM). FIG. 6 shows an example of such interleaving for a 28-row 4-column memory area. Thus, the left channel data strings $L_1$, $L_2$, . . . and the right channel data strings $R_1$, $R_2$, . . . are written in the first and the second rows in the regular order in the vertical direction as indicated by an arrow mark P, starting from the first row. After the words $L_{28}$ and $R_{28}$ are written in the 28th lines, the data strings $L_{29}$, $L_{30}$, . . . and the data strings $R_{29}$, $R_{30}$, . . . are sequentially written in the third and fourth rows, respectively. When the data are read from the memory, the data are read transversely in the sequence of the first column of the first row, the second column of the first row et seq., as indicated by an arrow mark Q, that is, in the order of the words $L_1$, $R_1$, $L_{29}$, $R_{29}$, $L_2$, $R_2$, $L_{30}$, $R_{30}$, . . . so as to be recorded on the recording medium such as the optical disk. Thus, the reproduced data signals are temporarily continuous data with the four-word periods, such that it becomes necessary to perform the interleaving on the data strings having four-word periods.

The interpolating circuit of FIG. 5 may be advantageously employed for the interleaving of the signals having such recording format.

In the above described embodiments, the succeeding value interpolation, the previous value holding and the mean value interpolation are selected for the leading word, the last word and the interjacent word in the block. However, the present invention is not limited to these specific embodiments. For example, the succeeding value or previous value interpolation may be used in place of the mean value interpolation for the interjacent word positions, while it is also possible to effect the second or higher order interpolation.

What is claimed is:

1. In a decoding deice in which input data signals are received from a decoding device, said signals as received being arranged into blocks each having a predetermined number of data words, the combination comprising:
    decoding means for decoding the signals in each block,
    detecting means connected to said decoding means for detecting an error in a data word, and
    interpolating means connected to said data means for interpolating the data word in which an error is detected using the data only in the block containing the word in which the error is detected,
    said interpolating means including succeeding word holding means adapted for substituting the value of the succeeding word for a leading word in the block when an error is detected in the leading word.

2. In a decoding device in which input data signals are received from a decoding device, said signals as received being arranged into blocks each having a predetermined number of data words, the combination comprising:
    decoding means for decoding the signals in each block,
    detecting means connected to said decoding means for detecting an error in a data word, and
    interpolating means connected to said data means for interpolating the data word in which an error is detected using the data only in the block containing the word in which the error is detected,
    said interpolating means including previous value holding means for substituting the preceding word for the last word in the block when an error is detected in said last word.

3. In a decoding device in which input data signals are received from a decoding device, said signals as received being arranged into blocks each having a predetermined number of data words, the combination comprising;
    decoding means for decoding the signals in each block,
    detecting means connected to said decoding means for detecting an error in a data word, and
    interpolating means connected to said data means for interpolating the data word in which an error is detected using the data in the block containing the word in which the error is detected,
    said input digital signals being arranged into blocks at intervals of a predetermined number of words and subjected blockwise to data compression, and means at the output side of said interpolating means for expanding the data blockwise.

4. A method of decoding and correcting input digital signals received in blocks, each with a predetermined number of data words, comprising the steps of detecting an error in a data word, and correcting the data word containing said error by interpolating the word having said error, using data in the block containing the word in which the error is detected,
    said interpolation including the steps of determining the position of a data word in the block which has a detected error, and interpolating the data word having said detected error in dependence on the position of said data word having the detected error.

5. The method according to claim 4, wherein said interpolating includes the step of substituting the value of the succeeding word for a leading word in said block when an error is detected in the leading word.

6. The method according to claim 4, wherein said interpolating includes the step of substituting the preceding word for the last word in said block when an error is detected in said last word.

7. A method of decoding and correcting input digital signals received in blocks, each with a predetermined number of data words, comprising the steps of detecting an error in a data word, and correcting the data word containing said error by interpolating the word having said error, using data in the block containing the word in which the error is detected,
    said interpolating including the steps of detecting the position in its block of a data word with an error, and selectively interpolating the data word having said detected error by substituting a preceding or succeeding word or substituting the average value of a preceding and a succeeding word, in dependence on the position in said block of said data word with said detected error.

8. In a decoding device in which input data signals are received from a decoding device, said signals as received being arranged into blocks each having a predetermined number of data words, the combination comprising;
    decoding means for decoding the signals in each block,
    detecting means connected to said decoding means for detecting an error in a data word,
    interpolating means connected to said data means for interpolating the data word in which an error is detected using the data in the block containing the word in which the error is detected,
    signal producing means connected to and responsive to said detection means for manifesting the position of a data word, having an error, within the block containing the data word, said interpolating means being connected to said signal producing means and operative to select an interpolating processing in dependence upon the error position in the data word in the block.

9. In a decoding device in which input data signals are received from a decoding device, said signals as received being arranged into blocks each having a predetermined number of data words, the combination comprising;
    decoding means for decoding the signals in each block,
    detecting means connected to said decoding means for detecting an error in a data word,
    interpolating means connected to said data means for interpolating the data word in which an error is detected using the data in the block containing the word in which the error is detected,
    means for identifying the mode of transmisson of each block, and means for controlling said decoding in accordance with the identified mode.

10. A method of decoding and correcting input digital signals received in blocks, each with a predetermined number of data words, comprising the steps of detecting an error in a data word, correcting the data word containing said error by interpolating the word having said error, using data in the block containing the word in which the error is detected, identifying the mode of transmisson of each block and decoding said block in accordance with the identified mode.

* * * * *